United States Patent

Hill et al.

[15] 3,653,071

[45] Mar. 28, 1972

[54] PROCESS FOR PRODUCING CIRCUIT ARTWORK UTILIZING A DATA PROCESSING MACHINE

[72] Inventors: John W. Hill, Richardson; Charles L. Satterwhite, Plano, both of Tex.

[73] Assignee: Texas Instruments Incorporated, Dallas, Tex.

[22] Filed: Jan. 8, 1970

[21] Appl. No.: 1,346

[52] U.S. Cl. ....................444/001, 235/151.11

[51] Int. Cl. ....................G06f 15/46

[58] Field of Search ....................235/150, 151, 151.1, 151.11; 340/172.5

[56] References Cited

OTHER PUBLICATIONS

Kallas: Computer Aided Wiring Designs. Bell Laboratories Record Nov. 1964 p. 343–349

Schorr: Computer Aided Digital System Design and Analysis IEEE Transactions on Electronic Computers p. 730–737

Chu: An ALGOL-like Computer Design Language Communications of the ACM Vol. 8 No. 10 Oct. 1965

Breuer: General Survey of Design Automation Proceedings IEEE Vol. 54 No. 12 Dec. 1966 p. 1708–1721

Hays: Computer Aided Design IEEE Transactions Vol. C-18N.1 Jan. 1969 p. 1–10

*Primary Examiner*—Felix D. Gruber

*Attorney*—James O. Dixon, Andrew M. Hassell, Harold Levine, Melvin Sharp, John E. Vandigriff, Henry T. Olsen, Michael A. Sileo, Jr. and Gary C. Honeycutt

[57] ABSTRACT

Artwork for a logic circuit to be fabricated by printed circuit board techniques is produced by a data processing machine programmed to run a packaging routine, a placement routine, and a routing routine, in addition to check routines. All logic elements for a particular circuit are coded and identified prior to carrying out any of the machine run routines. This circuit diagram information, along with mechanical criteria of the printed circuit board on which the circuit is to be fabricated, are supplied as input data to the data processing machine. The data processing machine first takes the coded circuit diagram information and checks it for errors. It then packages the individual logic elements into multi-element units (integrated circuits). Upon completion of the packaging routine, the data processor places the multi-element units within the limits of the mechanical criteria supplied as input data. After the packaging and placing routines have been completed, the machine routes interconnections between the terminal pins of the multi-element units using a numbered ordered maze restrained to proceed within pre-established limits.

36 Claims, 16 Drawing Figures

INVENTORS:
JOHN W. HILL
CHARLES L. SATTERWHITE

INVENTORS:
JOHN W. HILL
CHARLES L. SATTERWHITE

INVENTORS:
JOHN W. HILL
CHARLES L. SATTERWHITE

INVENTORS:
JOHN W. HILL
CHARLES L. SATTERWHITE

INVENTORS:
JOHN W. HILL
CHARLES L. SATTERWHITE

INVENTORS:
JOHN W. HILL
CHARLES L. SATTERWHITE

INVENTORS:
JOHN W. HILL
CHARLES L. SATTERWHITE

INVENTORS:
JOHN W. HILL
CHARLES L. SATTERWHITE

PROCESS FOR PRODUCING CIRCUIT ARTWORK UTILIZING A DATA PROCESSING MACHINE

This invention relates to a circuit layout technique, and more particularly to a process for producing artwork for a logic circuit to be fabricated by printed circuit techniques.

Heretofore, the artwork for most logic circuits that were fabricated on a printed circuit board was drawn by hand using "cut and try" procedures. So long as the logic system was of a simple design, manual layout techniques produced accurate artwork for use in the manufacture of the printed circuit board. With the increased complexity of logic systems, the artwork produced by hand contained an unacceptable number of errors. Further, as the logic circuitry became more complex, the time required for the hand layout increased to a prohibitive level.

It was early recognized that data processing machines (computers) could be used to layout and produce the artwork for logic circuits. Many processes have been developed for use with data processing machines to assist in laying out and producing the artwork for a logic circuit. Most of these processes have been directed to routing techniques performed by a data processor to interconnect the various logic elements or packages of elements that have been previously assigned a given location.

An object of this invention is to provide a process for producing circuit artwork by means of a data processing machine. Another object of this invention is to produce circuit artwork by a data processing machine that runs a check routine on the input data. Yet another object of this invention is to produce circuit artwork by a data processing machine that assigns individual circuit elements to multi-element packages. A further object of this invention is to provide a process for producing circuit artwork with a data processing machine that assigns multi-element packages within limits of mechanical criteria. Yet another object of this invention is to provide a process for producing circuit artwork using a data processing machine to route interconnections between various terminal pins of multi-element units previously located. Yet another object of this invention is to produce circuit artwork by a data processing machine that runs a check routine on the routed interconnections. A still further object of this invention is to provide a process for producing circuit artwork using a data processing machine that assigns individual circuit elements to a multi-element package by repetitive steps that select the best multi-element package. Still another object of this invention is to provide a process for producing circuit artwork using a data processing machine that places a multi-element package within circuit criteria on the basis of a calculated score. An additional object of this invention is to provide a process for producing circuit artwork using a data processing machine that routes interconnections between elements by a numbered ordered maze constrained to run within pre-established limits.

In multi-element with one process for producing circuit artwork, artwork for a logic system is produced by initially packaging individual circuit elements by a routine that selects the best multielement unit yet by a first comparison of one multi-element unit with a multi-element unit formed from elements of another type. After all the multi-element units have been considered in a first pass, the best unit is then considered a fixed package and additional passes are made to select the best multi-element unit by an additional series of comparisons. After each selection of a best multi-element unit for a given comparison, the remaining multi-element unit formed for that comparison is cancelled and a new multi-element unit of that type will be formed in the subsequent pass. After completing the packaging routine, the multi-element units are located on a printed circuit board within limits of mechanical criteria supplied as input data to the processing machine. After packaging and placing the circuit elements, routing interconnections are generated between terminal pins of the individual elements using a numbered ordered maze. To complete the process of defining interconnections between the elements, the routing information is conveyed to a plotter that generates the artwork for a desired logic system.

In accordance with another process for producing circuit artwork, coded information of a logic system including mechanical criteria is input data to a data processing machine. First, the data processor generates representations of multi-element packages containing the individual elements of the logic system. After completion of the packaging routine, the multi-element packages are located on a printed circuit board within limits of the mechanical criteria supplied to the machine. To locate the multi-element packages formed by the packing routine, the data processor computes a "score" for each multi-element unit to be located. Starting with the best score, the packages are located in the best legitimate position available for that unit. The remaining units are then considered after recomputing a score for the effected units, starting with the best remaining score, and the unit with the highest score is placed in a best legitimate position. This process is repeated until all packages have been placed. After placing all the multi-element packages on a score basis, the entire logic system is reinvestigated to determine if an improvement of the initial placement is possible. Upon completion of the placement routine, the data processor interconnects terminal pins of the individual circuit elements using a numbered ordered maze. Finally, the routing information is conveyed to a plotter that generates artwork for the logic system coded into the data processor.

In accordance with still another process for producing circuit artwork, circuit artwork for a logic system is generated using a plotter connected to the output of a data processor. Input information to the data processor includes identifying codes for each of the logic circuit elements, the element terminal pins, signature identification and mechanical criteria. First, the individual circuit elements are packaged into multi-element units on the basis of the circuit identification codes, terminal pin codes, and signature codes. These multi-element units are then located on a printed circuit board within mechanical criteria supplied as input data to the data processor. After packaging and placing the logic elements, interconnections between terminal pins of the various elements are established using a numbered ordered maze restrained to proceed within pre-established limits. Input information to the routing routine includes signal set groups which consist of pin identification (including X and Y coordinates) along with "-from-to" information. Starting at the first pin location in a pin listing, a numbered ordered maze is constructed within pre-established limits until it reaches a destination point. Upon reaching a destination point, a backtrack routine is called which establishes the shortest path within the maze back to the start point. The routing routine of the present invention includes three passes for interconnecting the various element terminal pins. Each pass restricts the maze progression to certain predefined limits. Upon completion of one run of the routine, the interconnections not completed on the first run may be attempted by running the routing routine again, each time changing the bounding criteria. After all the interconnections have been completed, a plotter is supplied the coded information produced by the data processing machine to generate artwork for the logic system of interest.

In accordance with yet another process for producing circuit artwork, a data processing machine supplies input information to a plotter that produces the circuit artwork. Input information to the data processor includes coded information defining the logic circuit. This coded information includes logic element coding, terminal pin coding, signature identification and mechanical criteria. Initially, the data processor calls a check routine that checks the coded input information to determine if errors exist in the logic diagram. For example, the input of a logic element may not be connected to a source, or a source may be connected to more elements that it is capable of driving without overloading. After checking to insure that the coded logic information contains no errors, a routine run by the data processor packages the logic elements into multi-element units. These multi-element units are located on a printed circuit board constrained by mechanical input criteria by a package placing routine. Next, a routing routine establishes coded data for interconnecting paths between terminal pins of the logic elements using a numbered ordered maze. The routing routine may be run as many times a desired in an attempt to complete all interconnections. Upon completion of the routing routine, the coded data representing the interconnecting paths is checked for completeness. Upon completion of the routing check, the coded routing data is conveyed to a plotter that produces artwork for a logic system.

A more complete understanding of the invention and its advantages will be apparent from the specification and claims and from the accompanying drawings illustrative of the invention.

Certain portions of the method herein disclosed are not of our invention, but are the inventions of: Joseph A. Ballas and Robert A. Penick as defined by the claims of their application, Ser. No. 001,366, filed Jan. 8, 1970; Joseph A. Ballas and Robert A. Penick as defined by the claims of their application, Ser. No. 001,447, filed Jan. 8, 1970; and Mark F. Eskew and Beverly F. Hyde as defined by the claims of their application, Ser. No. 001,525, filed Jan. 8, 1970, all such applications being assigned to the assignee of the present application.

Referring to the drawings.

Figure 1:
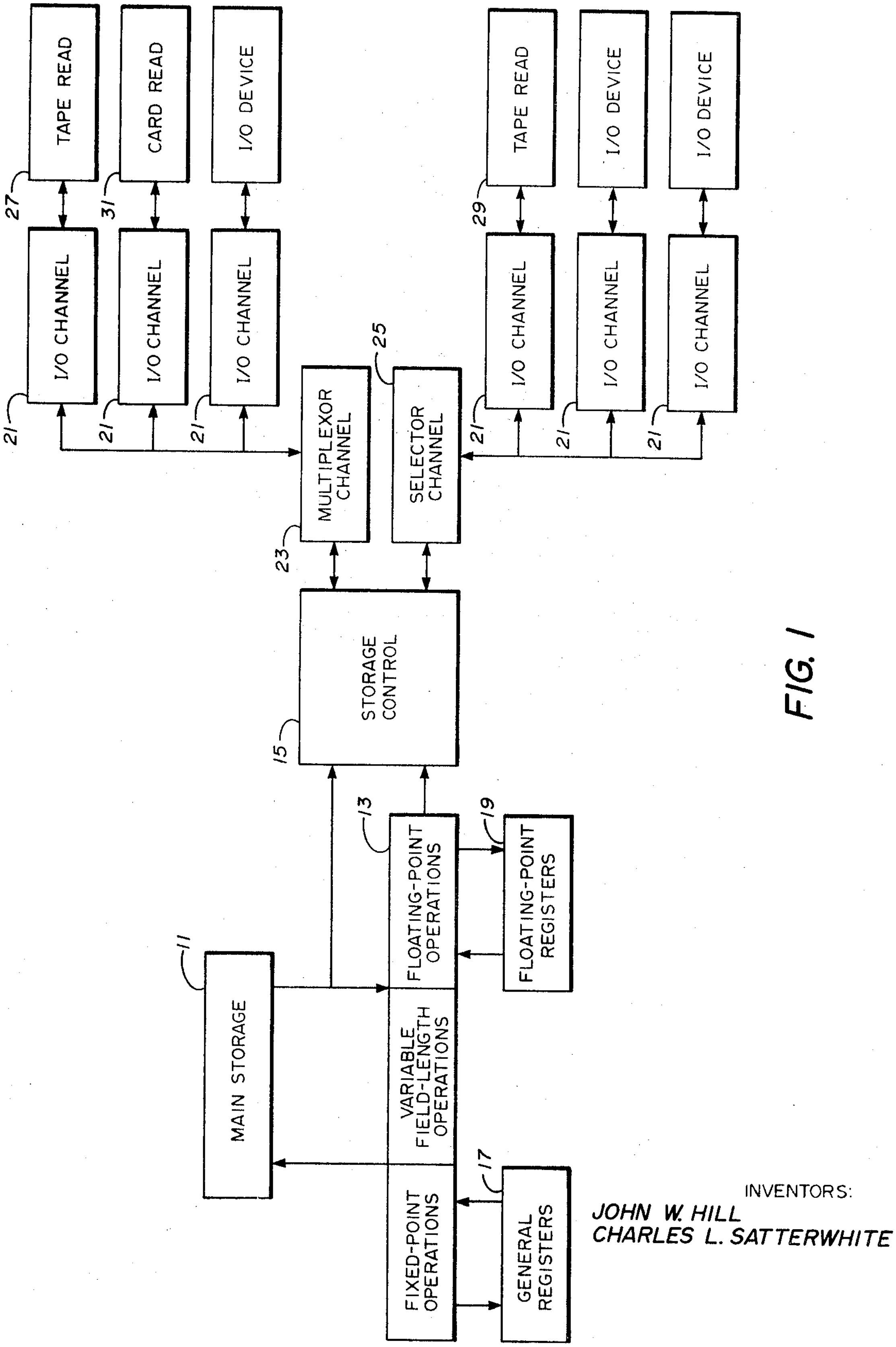
FIG. 1 is a block diagram of a data processing machine for generating instruction for the production of circuit artwork.
Figure 2:
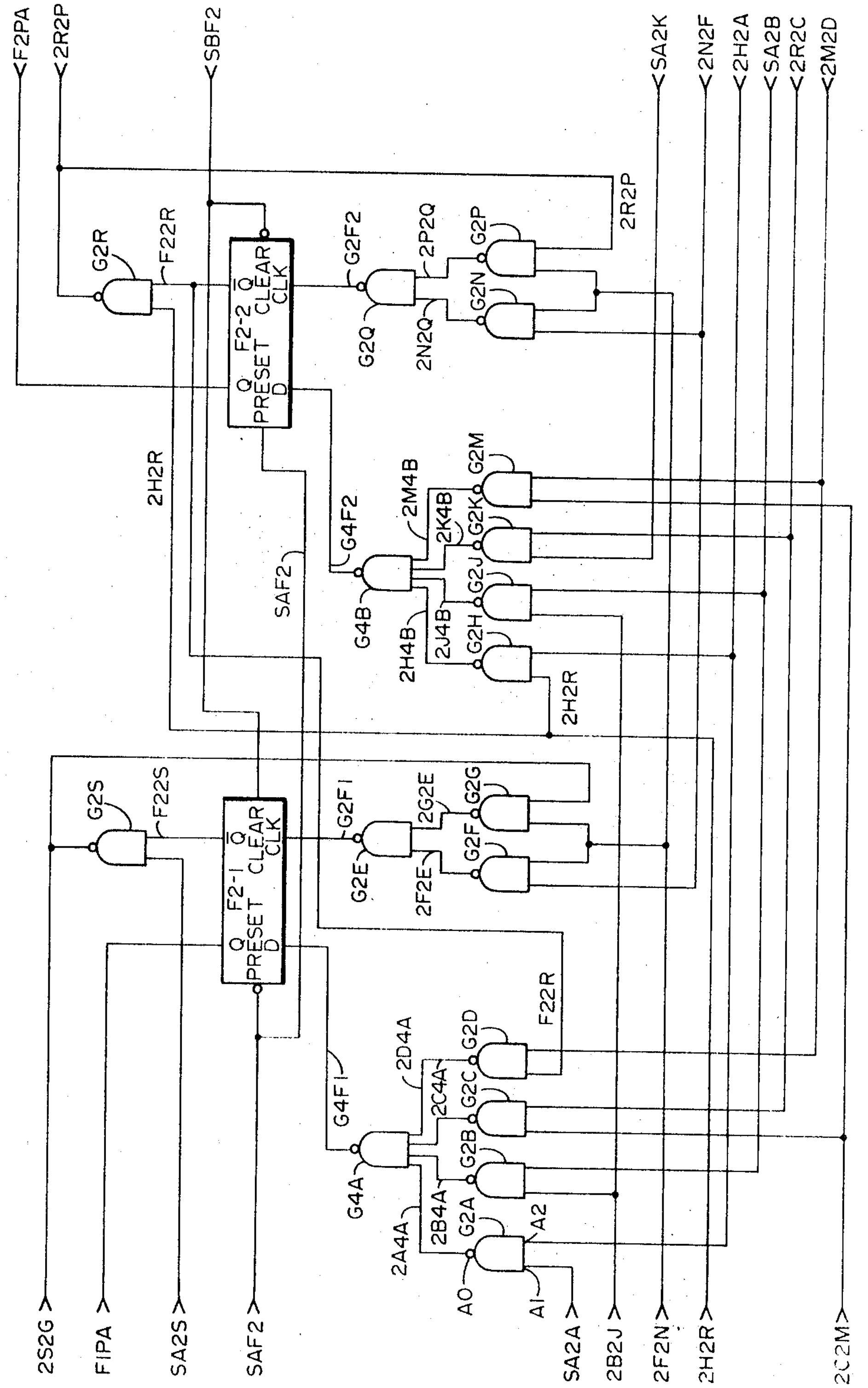
FIG. 2 is a schematic diagram of a logic system including coding information to be read into the data processing machine of FIG. 1 for generating artwork for a printed circuit board.
Figure 3:
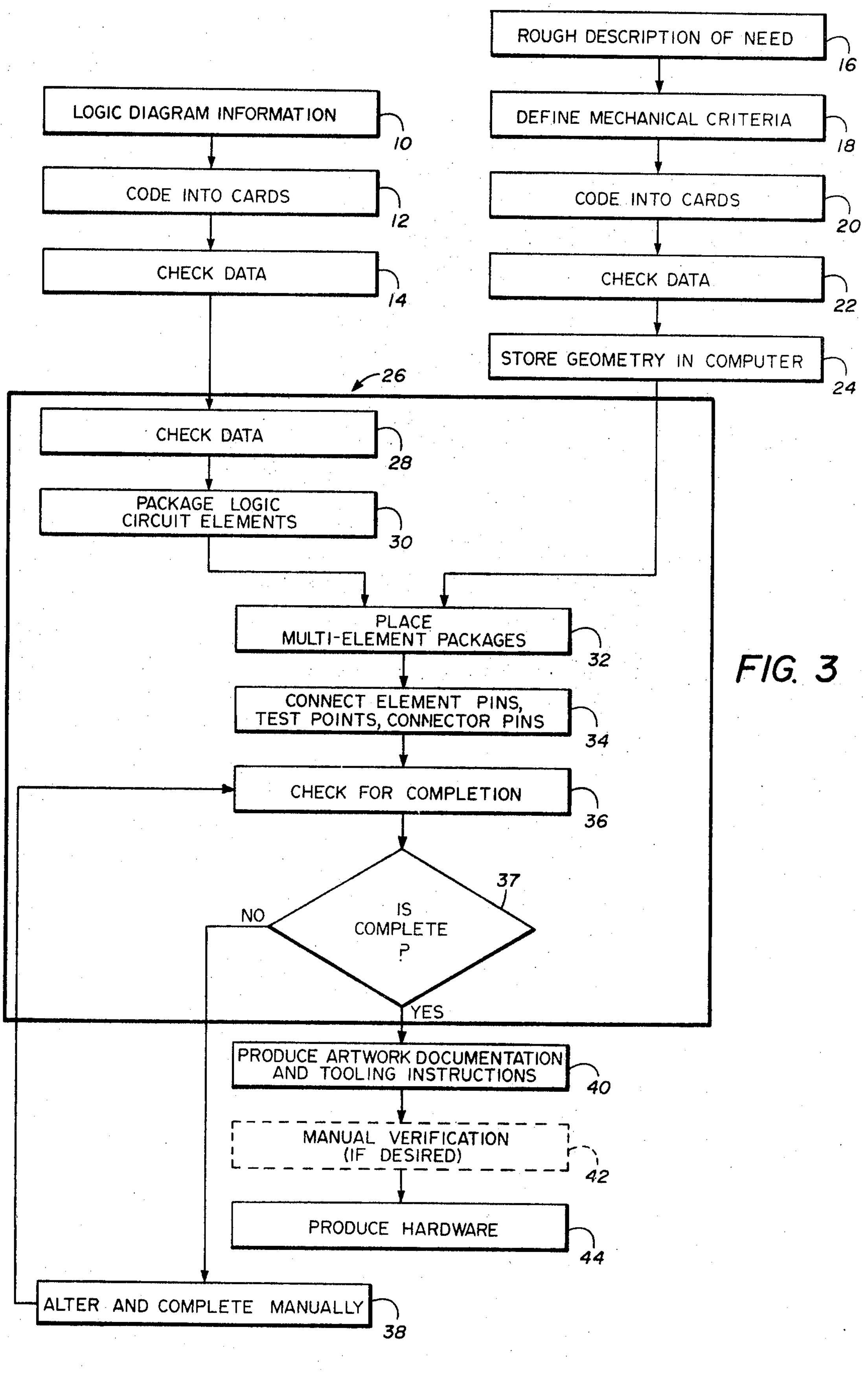
FIG. 3 is a flow chart of a process for producing artwork for a logic system of the type illustrated in FIG. 2.
Figure 4:
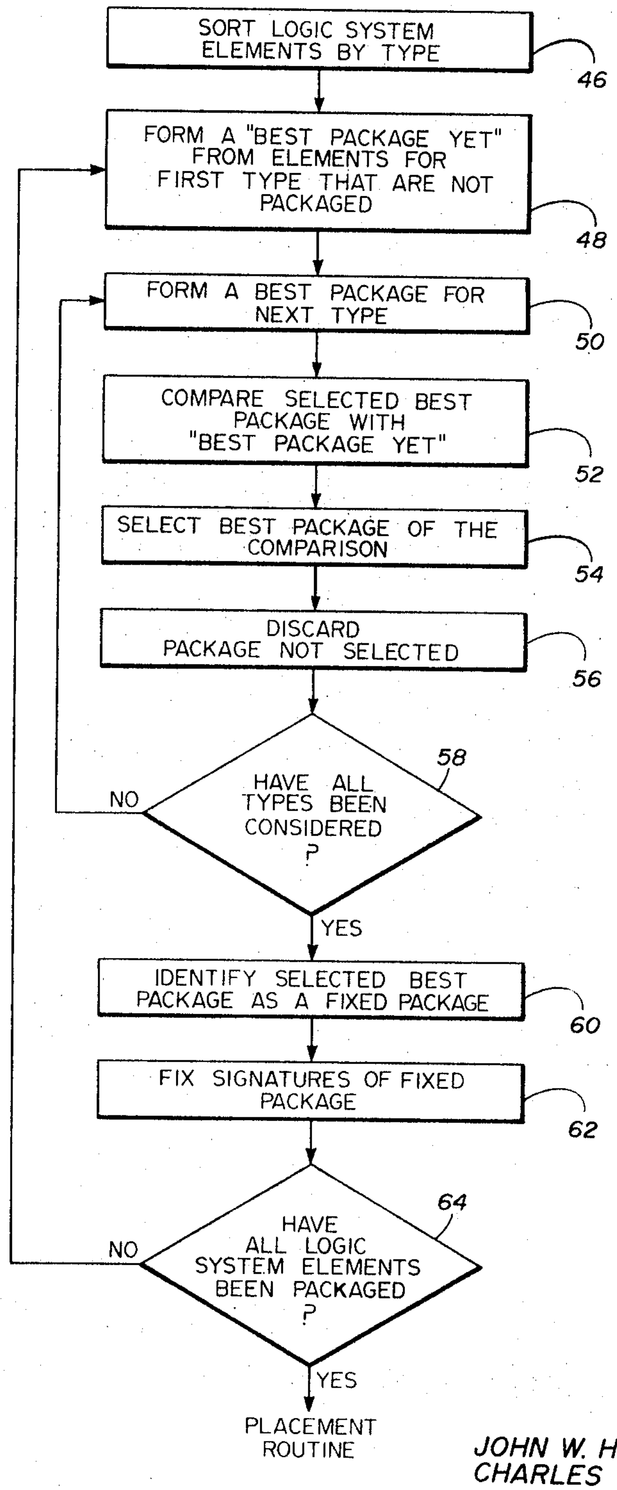
FIG. 4 is a flow chart of a routine run by a data processing machine for packing circuit elements into multi-element packages.
Figure 5:
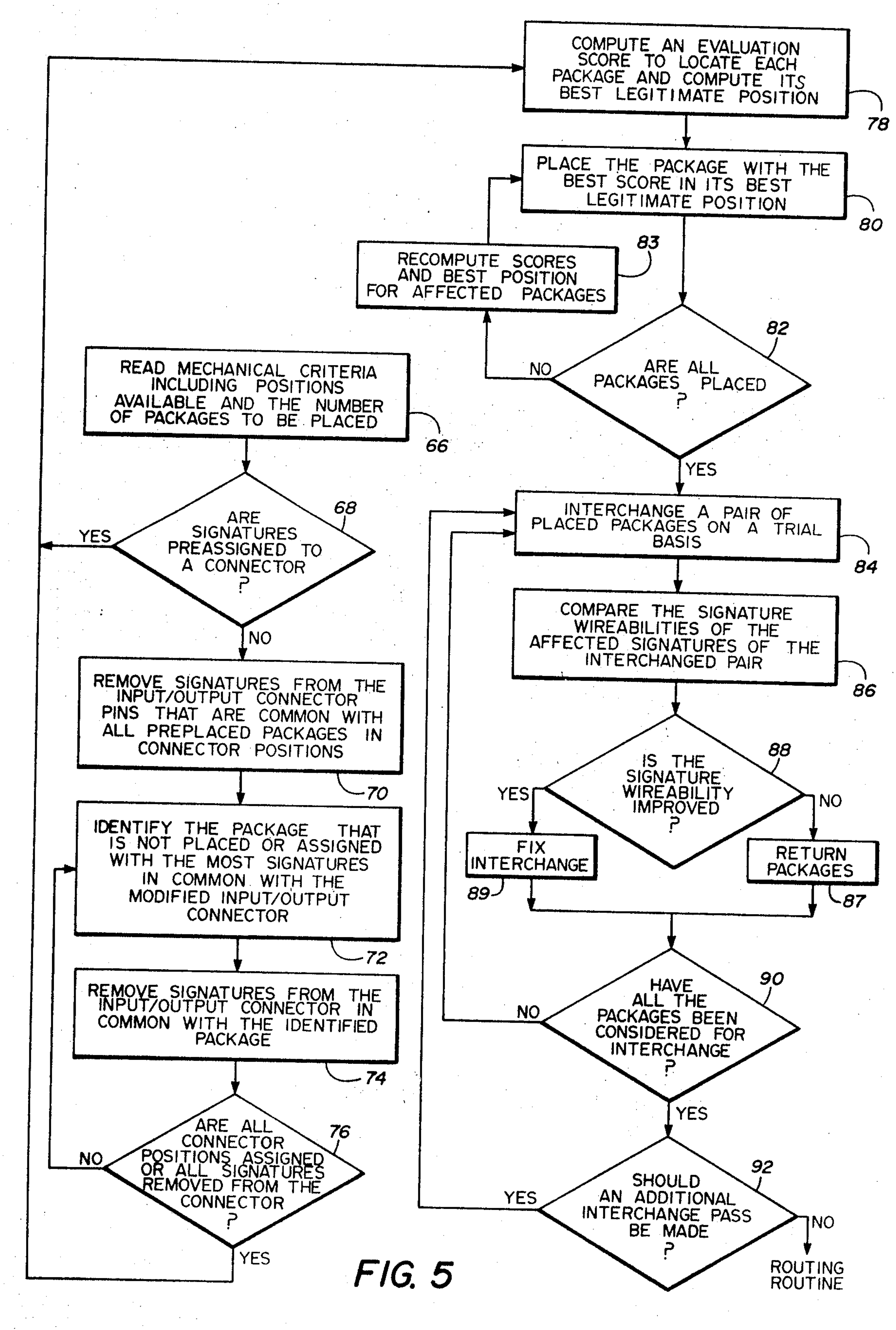
FIG. 5 is a flow chart of a routine run by a data processing machine for placing multi-element packages on a printed circuit board within mechanical criteria.
Figure 6:
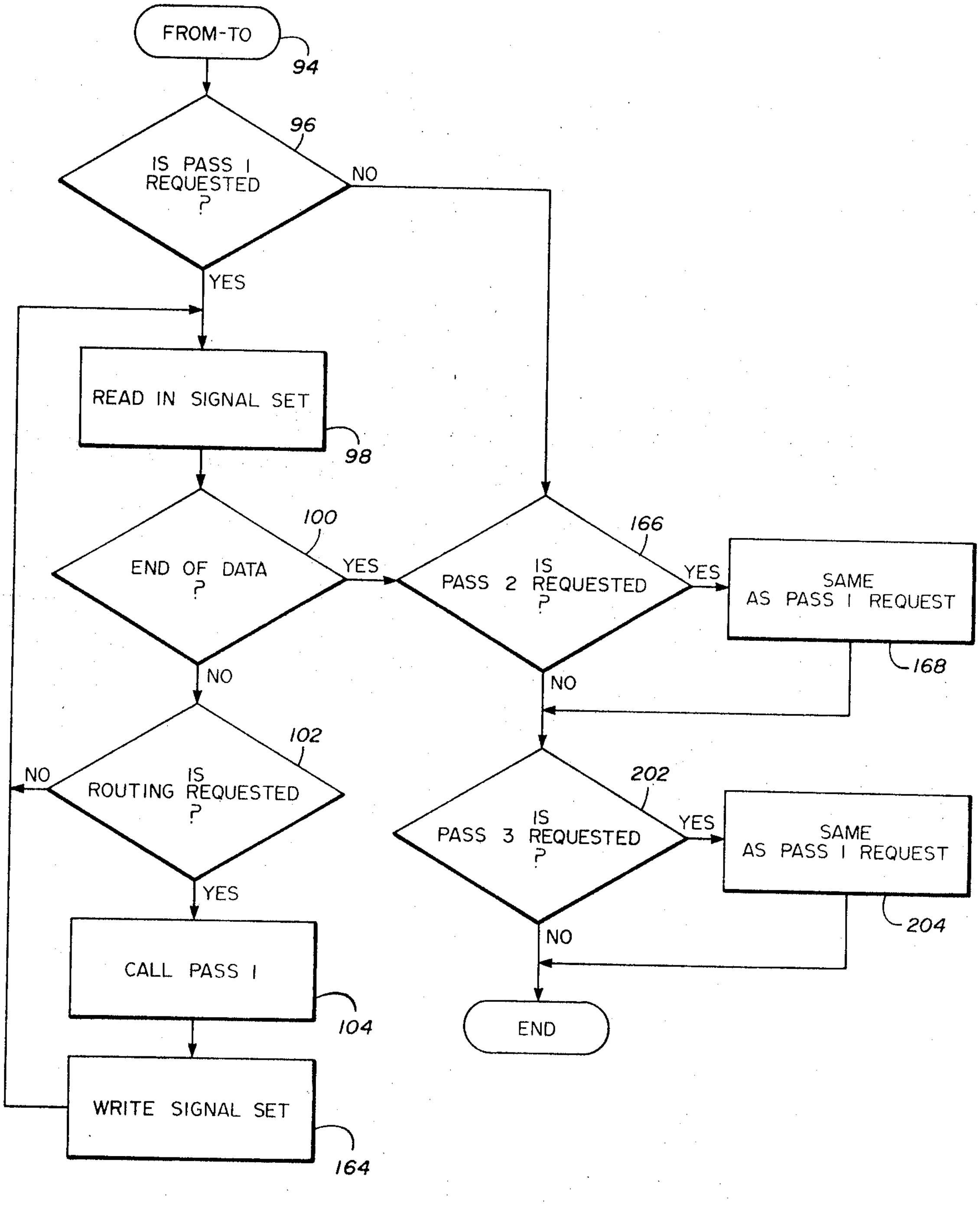
FIG. 6 is a flow chart of the routing routine run by a data processing machine for interconnecting element pins on a printed circuit board.
Figure 7:
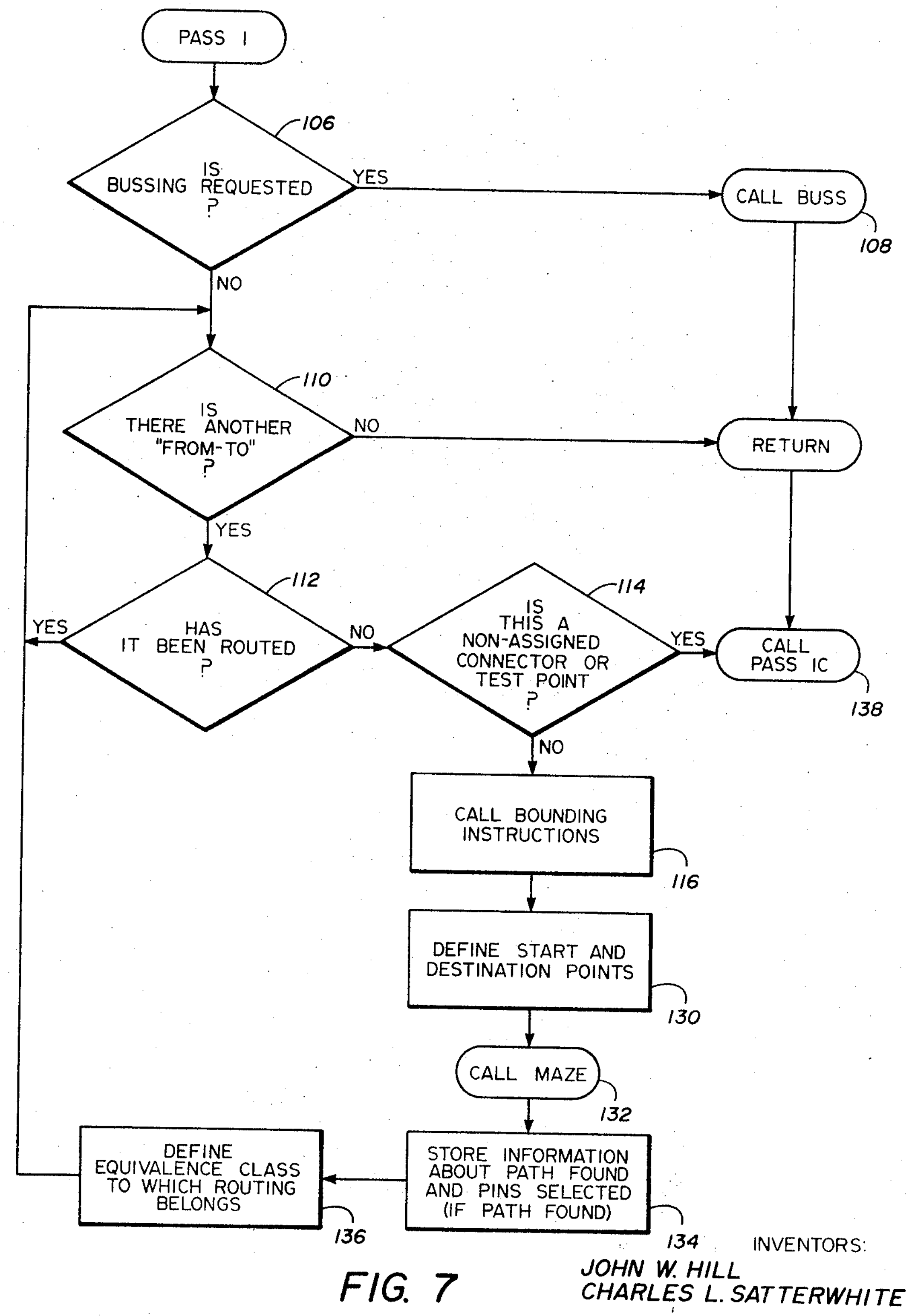
FIG. 7 is a flow chart of a pass one subroutine called by the routing routine of FIG. 6.
Figure 8:
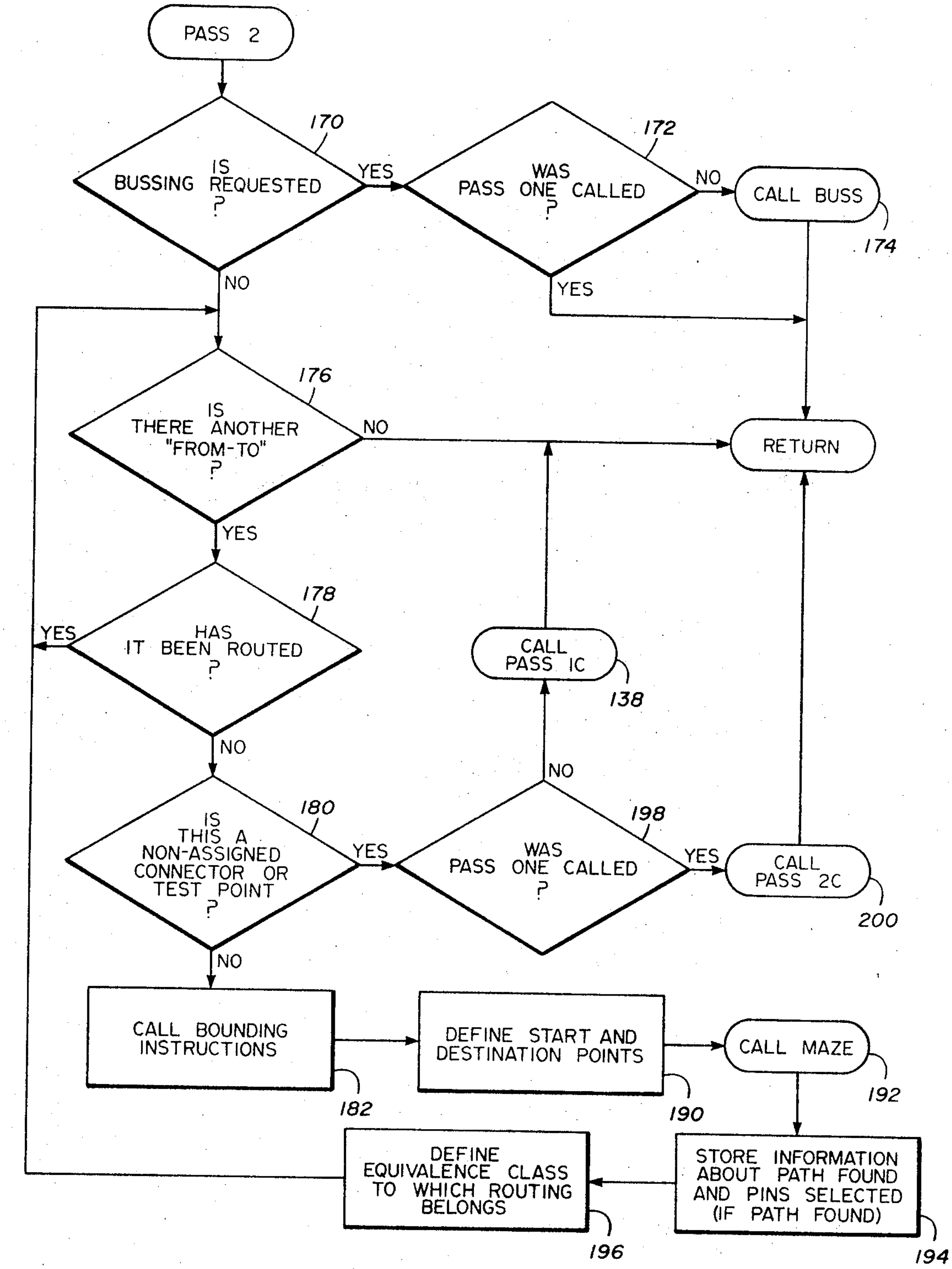
FIG. 8 is a flow chart of a pass two subroutine called by the routing routine of FIG. 6.
Figure 9:
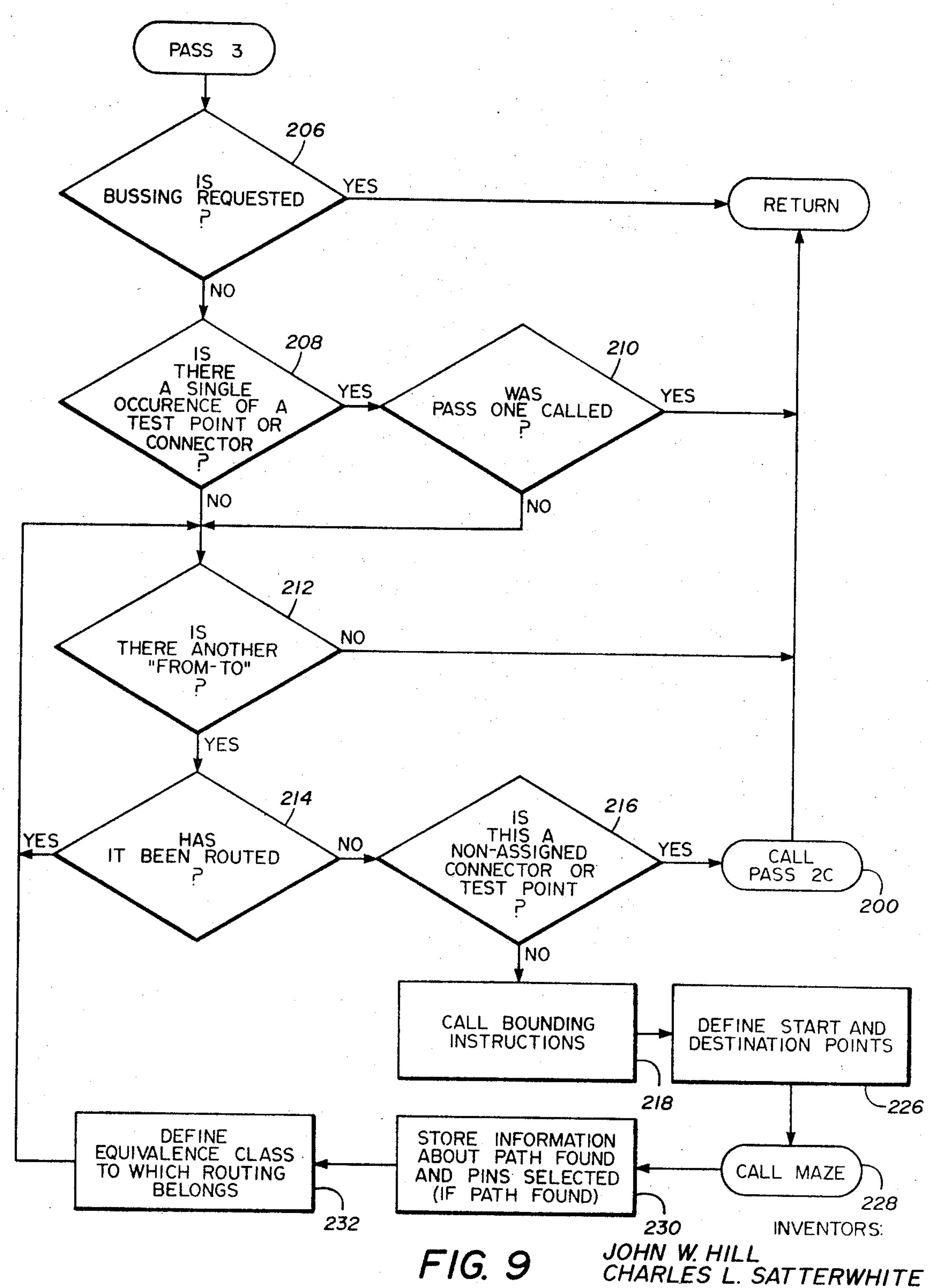
FIG. 9 is a flow chart of a pass three subroutine called by the routing routine of FIG. 6.
Figure 10:
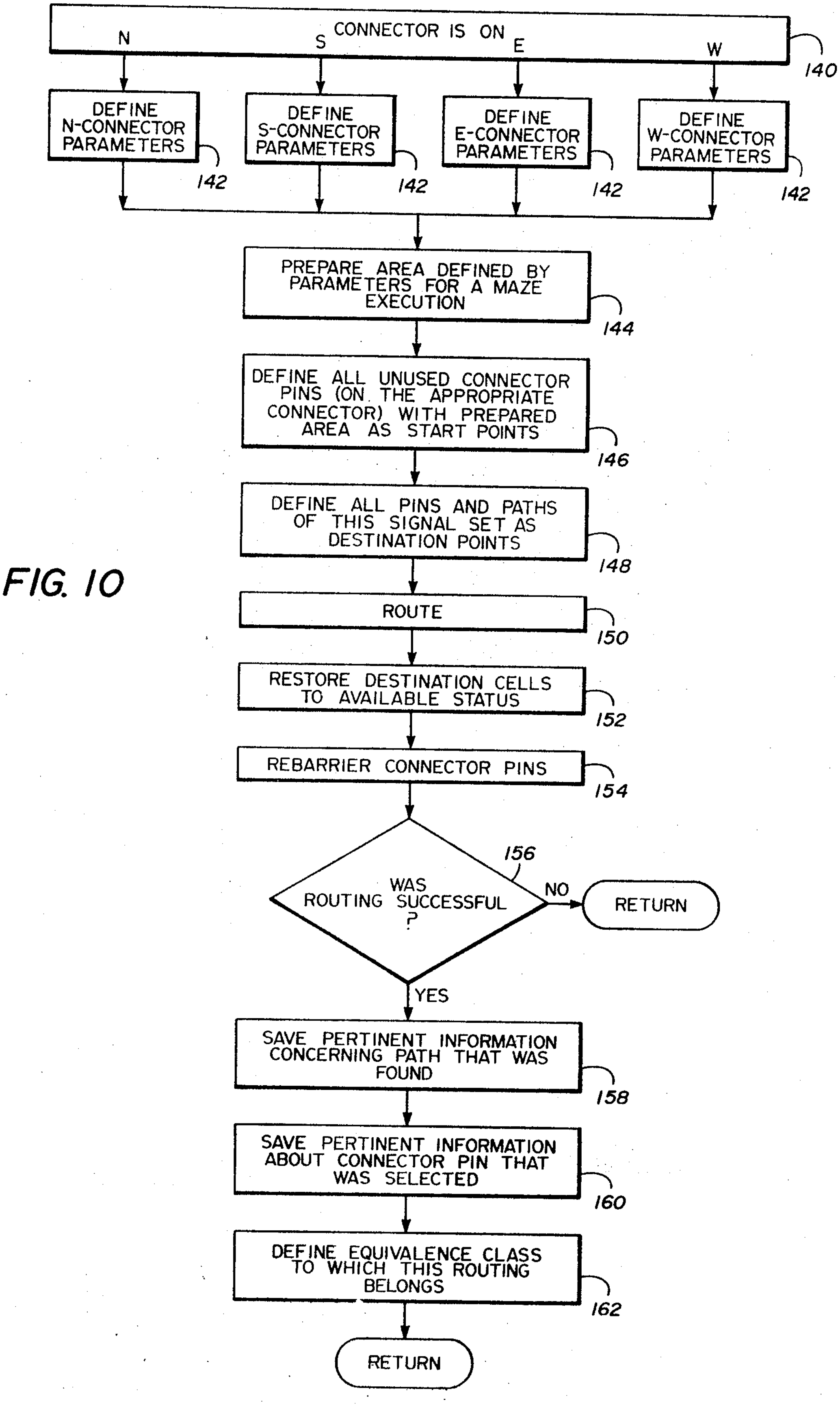
FIG. 10 is a flow chart of a connector subroutine called by the routing routine of FIG. 6.
Figure 11A:
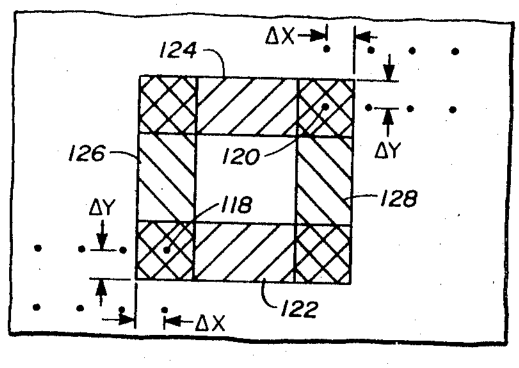
FIGS. 11A, 11B and 11C illustrate bounding limitations for the three subroutines of FIGS. 7, 8 and 9, respectively.
Figure 11B:
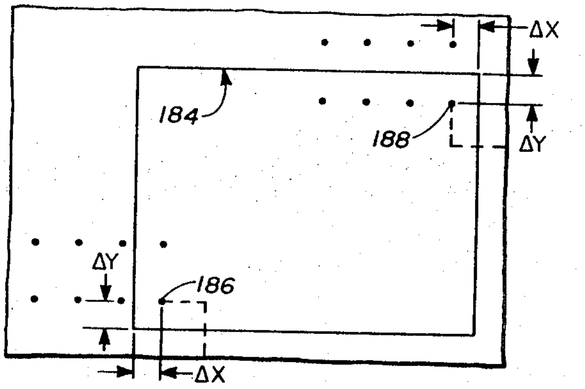
Figure 11C:
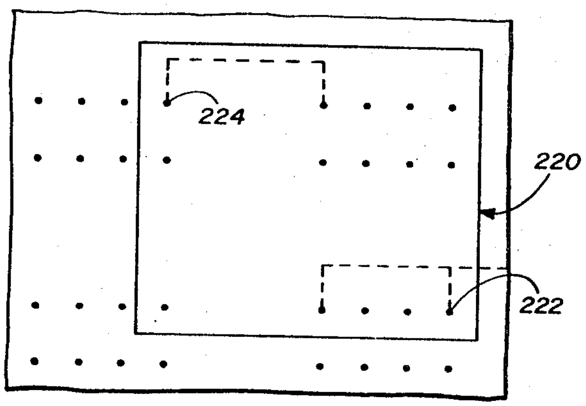
Figure 12:
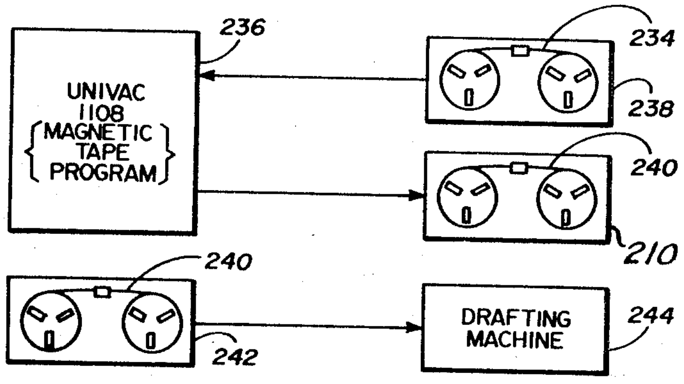
FIG. 12 is a block diagram of a system for generating artwork for a printed circuit board.
Figure 13:
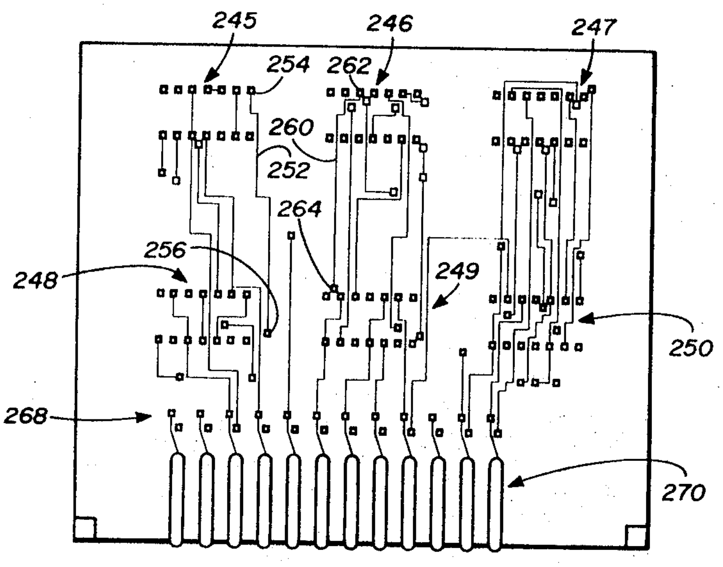
FIG. 13 illustrates the artwork for the top side of a two-sided printed circuit board for the system of FIG. 2.
Figure 14:
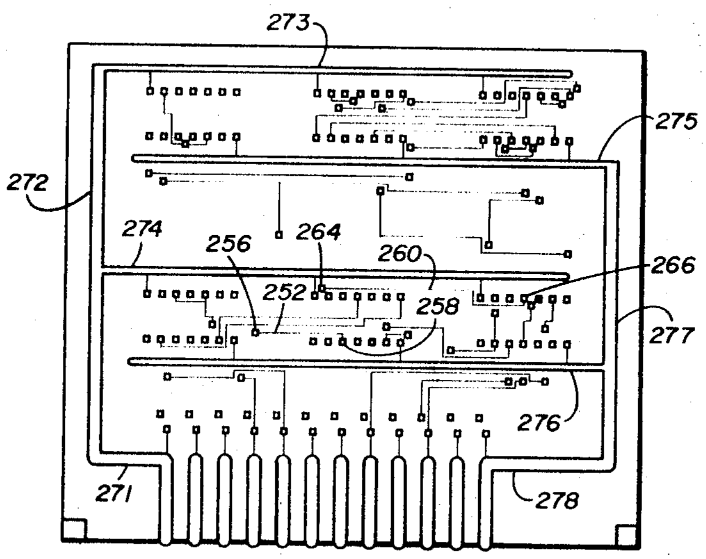
FIG. 14 illustrates the artwork for the bottom side of a two-sided printed circuit board for the logic system of FIG. 2.

For a complete description of our invention including a complete description of FIGS. 1–14, reference is made to U.S. Pat. No. 3,653,072, (Pat. Application Ser. No. 1,366) issued to Joseph A. Ballas and Robert A. Penick on Mar. 28, 1972 and assigned to the assignee of the present invention. The specification of U.S. Pat. No. 3,653,072 (Pat. Application Ser. No. 1,366) is hereby incorporated herein by reference and made a part hereof.

We claim:

1. In a process for producing a coded representation of circuit artwork from coded input information representing a desired logic system and coded mechanical input criteria for a circuit board by a data processing machine, the steps of:

a. checking the coded input information as it is received by the data processing machine against standards stored in said data processing machine to determine the completeness and accuracy of such coded input information;

b. generating representations of multi-element packages of circuit elements of the desired logic system from the coded input information after it has been checked;

c. generating representations of locations for the multi-element packages upon a circuit board layout in accordance with said coded mechanical input criteria; and d. generating said coded representation of the circuit artwork comprising a representation of interconnections between terminal pins of the located packages using a numbered ordered maze and backtracking routine.

2. In the process of claim 1, the step of operating a data plotter in accordance with the coded representation of the circuit artwork to record an image of the circuit artwork.

3. In the process of claim 1, the step of storing the generated representation of said circuit artwork on a storage medium.

4. In the process of claim 3, the generated representation of the circuit artwork is stored on magnetic tape.

5. In the process of claim 3, including the step of operating a data plotter in accordance with the stored representation of the circuit artwork to record an image of the circuit artwork.

6. In the process of claim 1, the step of checking the coded input information includes the steps of:

a. checking the coded information to determine if each signature of the logic systems has a source;

b. checking the coded input information to determine if each signature appears at more than one element; and c. checking the coded input information to determine if each signature has only one source.

7. In the process of claim 1, the step of checking the coded input information includes the steps of:

a. checking the coded input information to determine if each element in the logic system corresponds to a real element as defined by the standards stored in said data processing machine; and b. checking the coded input information to determine if each terminal of the elements of the logic system corresponds to a real pin as defined by the standards stored in said data processing machine.

8. In the process of claim 1, the step of checking the coded input information includes the steps of:

a. checking the coded input information to determine if each element will operate within its power capabilities;

b. checking the coded input information to determine if each element has at least one input signature and an output signature; and c. checking the coded input information to determine if each element has an identifying name.

9. In the process of claim 1, the step of checking the coded input information includes the steps of:

a. checking the coded input information to determine if each terminal pin is identified with only one element; and b. checking the coded input information to determine if each terminal pin identification appears only once on one element 10. In a process for producing a coded representation of circuit artwork from coded input information representing a desired logic system and coded mechanical input criteria for a circuit board by a data processing machine, the steps of:

a. generating representations of multi-element packages of circuit elements of the desired logic system from the coded input information;

b. generating representations of locations for the multi-element packages upon a circuit board layout in accordance with said coded mechanical input criteria;

c. generating said coded representation of the circuit artwork comprising a representation of interconnections between terminal pins of the located packages using a numbered ordered maze and backtracking routine; and d. checking the coded representation of the circuit artwork against standards stored in said data processing machine to determine the completeness and accuracy of such coded representation of the circuit artwork.

11. In the process of claim 10, the step of operating a data plotter in accordance with the coded representation of the circuit artwork to record an image of the circuit artwork.

12. In the process of claim 10, the step of storing the generated representation of said circuit artwork on a storage medium.

13. In the process of claim 12, the generated representation of the circuit artwork is stored on magnetic tape.

14. In the process of claim 12, including the step of operating a data plotter in accordance with the stored representation of the circuit artwork to record an image of the circuit artwork.

15. In the process of claim 10, the step of checking the coded representation of the circuit artwork includes the steps of:

a. checking the coded representation of the circuit artwork to determine if more than one signature has been connected to an element terminal pin;
b. checking the coded representation of the circuit artwork to determine if more than one signature has been connected to the same feedthrough circuit board layers;
c. checking the coded representation of the circuit artwork to determine if all signatures of the desired logic system have been routed.

16. In the process of claim 10, the step of checking the coded representation of the circuit artwork includes the steps of:

a. checking the coded representation of the circuit artwork to determine if two interconnecting paths having different signatures cross on the same circuit board layer;
b. checking the coded representation of the circuit artwork to determine if an interconnecting path crosses a circuit board cell occupied by an unused element terminal pin;
c. checking the coded representation of the circuit artwork to determine if an interconnecting path crosses the circuit board on a diagonal; and
d. checking the coded representation of the circuit artwork to determine if all interconnecting paths terminate at an element terminal.

17. In the process of claim 10, the step of checking the coded representation of the circuit artwork includes the step of checking the coded representation of the circuit artwork to determine if continuity exists between all terminal pins having a common signature.

18. In a process for producing a coded representation of circuit artwork from coded input information representing a desired logic system and coded mechanical input criteria for a circuit board by a data processing machine the steps of:

a. checking the coded input information as it is received by the data processing machine against standards stored in said data processing machine to determine the completeness and accuracy of such coded input information;
b. generating representations of multi-element packages of circuit elements of the desired logic system from the coded input information after it has been checked;
c. generating representations of locations for multi-element packages upon a circuit board layout in accordance with said coded mechanical input criteria;
d. generating said coded representation of the circuit artwork comprising a representation of interconnections between terminal pins of the located packages using a numbered ordered maze and backtracking routine; and
e. checking the coded representation of the circuit artwork against standards stored in said data processing machine to determine the completeness and accuracy of such coded representation of the circuit artwork.

19. In the process of claim 18, the step of checking the coded input information including the steps of:

a. checking the coded input information to determine if each signature has a source;
b. checking the coded input information to determine if each signature appears in more than one terminal pin; and
c. checking the coded input information to determine if each signature has only one source.

20. In the process of claim 18, the step of checking the coded input information including the steps of:

a. checking the coded input information to determine if each element operates within its power capabilities;
b. checking the coded input information to determine if each element has at least one input signature and an output signature; and
c. checking the coded input information to determine if each element has an identifying code.

21. In the process of claim 20, the step of checking the coded input information further including the steps of:

a. checking the coded input information to determine if an element of the logic system corresponds to an element as defined in the standards stored in said data processing machine; and
b. checking the coded input information to determine if each terminal of an element corresponds with the standards stored in said data processing machine.

22. In the process of claim 18, the step of checking the coded input information including the steps of:

a. checking the coded input information to determine if all preplaced elements have been assigned a multi-element package;
b. checking the coded input information to determine if all packaged elements have been assigned sequentially numbered packages;
c. checking the coded input information to determine if two preassigned elements of a multi-element package have been assigned the same position in a package;
d. checking the coded input information to determine if an element has been preassigned a position which is not a legitimate position for that element; and
e. checking the coded input information to determine if more elements have been assigned to one multi-element package than possible for that type.

23. In the process of claim 18, the step of checking the coded input information including the steps of:

a. checking the coded input information to determine the coordinates of the terminal pins with respect to a reference to each element of a multi-element package; and
b. checking the coded input information to determine if a signature appears only at an input/output connector terminal.

24. In the process of claim 18, the step of checking the coded representation of the circuit artwork including the steps of:

a. checking the coded representation of the circuit artwork to determine if more than one signature has been connected to an element terminal pin;
b. checking the coded representation of the circuit artwork to determine if more than one signature has been connected to the same feedthrough between circuit board layers; and
c. checking the coded representation of the circuit artwork to determine if all signatures of the desired logic system have been routed.

25. In the process of claim 24, the step of checking the coded representation of the circuit artwork further including the steps of:

a. checking the coded representation of the circuit artwork to determine if two interconnecting paths having different signatures cross on the same circuit board layer;
b. checking the coded representation of the circuit artwork to determine if an interconnecting path crosses a circuit board cell occupied by an unused element terminal pin;
c. checking the coded representation of the circuit artwork to determine if an interconnecting path crosses the circuit board on a diagonal; and
d. checking the coded representation of the circuit artwork to determine if all interconnecting paths terminate at an element terminal pin.

26. In the process of claim 24, the step of checking the coded representation of the circuit artwork further including the step of checking the coded representation of the circuit artwork to determine if continuity exists between all terminal pins having a common signature.

27. In a process for producing a coded representation of circuit artwork from coded input information representing a desired logic system and coded mechanical input criteria for a circuit board by a data processing machine, the steps of:

a. checking the coded input information as it is received by the data processing machine against predefined standards to determine the completeness and accuracy of such coded input information;
b. generating representations of multi-element packages of circuit elements of the desired logic system from the coded input information after it has been checked;
c. generating representations of locations for the multi-element packages from the generated representations of such multi-element packages upon a circuit board layout in accordance with said coded mechanical input criteria; and
d. generating said coded representation of the circuit artwork comprising a representation of interconnections between terminal pins of the located packages from the generated representations of the locations for the multi-element packages using a numbered using maze and backtracking routine.

28. In the process of claim 27, the step of operating a data plotter in accordance with the representation of the circuit artwork to produce a recorded image of the circuit artwork.

29. In the process of claim 27, the step of storing the generated representation of the circuit artwork on a storage medium.

30. In the process of claim 29, the generated representation of the circuit artwork is stored on magnetic tape.

31. In the process of claim 29, including the step of operating a data plotter in accordance with the stored representation of the circuit artwork to produce a recorded image of the circuit artwork.

32. In a process for producing a coded representation of circuit artwork from coded input information representing a desired logic system and coded mechanical input criteria for a circuit board by a data processing machine, the steps of:

a. generating representation of multi-element packages of circuit elements of the desired logic system from the coded input information;
b. generating representations of locations for the multi-element packages from the generated representation of the multi-element packages upon a circuit board layout in accordance with said coded mechanical input criteria;
c. generating said coded representation of the circuit artwork comprising a representation of interconnections between terminal pins of the located packages from the generated representation of the locations for the multi-element packages using a numbered ordered maze and backtracking routine; and
d. checking the coded representation of the circuit artwork against predefined standards to determine the completeness and accuracy of such coded representation of the circuit artwork.

33. In the process of claim 32, the step of operating a data plotter in accordance with the coded representation of the circuit artwork to produce a recorded image of the circuit artwork.

34. In the process of claim 32, the step of storing the generated representation of said circuit artwork on a storage medium.

35. In the process of claim 34, the generated representation of the circuit artwork is stored on magnetic tape.

36. In the process of claim 34, including the step of operating a data plotter in accordance with the stored representation of the circuit artwork to produce a recorded image of the circuit artwork.

* * * * *